United States Patent
Sharon

(10) Patent No.: US 11,231,997 B2
(45) Date of Patent: Jan. 25, 2022

(54) STORAGE SYSTEM AND METHOD FOR BALANCED QUAD-LEVEL CELL (QLC) CODING WITH MARGIN FOR AN INTERNAL DATA LOAD (IDL) READ

(71) Applicant: Western Digital Technologies, Inc., San Jose, CA (US)

(72) Inventor: Eran Sharon, Rishon Lezion (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/914,764

(22) Filed: Jun. 29, 2020

(65) Prior Publication Data

US 2021/0406121 A1 Dec. 30, 2021

(51) Int. Cl.
*G06F 11/10* (2006.01)
*G06F 11/30* (2006.01)
*G06F 3/06* (2006.01)

(52) U.S. Cl.
CPC ........ *G06F 11/1072* (2013.01); *G06F 3/0619* (2013.01); *G06F 3/0656* (2013.01); *G06F 3/0659* (2013.01); *G06F 3/0679* (2013.01); *G06F 11/1044* (2013.01); *G06F 11/3037* (2013.01)

(58) Field of Classification Search
CPC .... G06F 3/0659; G06F 3/0656; G06F 3/0679; G06F 3/0619; G06F 11/1044; G06F 11/1072

See application file for complete search history.

(56) References Cited

U.S. PATENT DOCUMENTS

| | | | |
|---|---|---|---|
| 8,861,269 B2 | 10/2014 | Chen et al. | |
| 9,070,427 B2 | 6/2015 | Sharon et al. | |
| 9,830,983 B1* | 11/2017 | Hara | G11C 16/26 |
| 2015/0043276 A1* | 2/2015 | Sharon | G06F 11/1068 |
| | | | 365/185.03 |
| 2015/0332759 A1* | 11/2015 | Huang | G11C 11/5642 |
| | | | 365/185.03 |
| 2017/0322843 A1* | 11/2017 | Hsu | G06F 11/108 |
| 2019/0096449 A1* | 3/2019 | Kim | G11C 7/1057 |

OTHER PUBLICATIONS

Liu et al., QLC NAND study and enhanced Gray coding methods for sixteen-level based program algorithms, Elsevier, Microelectronics Journal 66, pp. 58 to 66 (Year: 2017).*

* cited by examiner

*Primary Examiner* — Shelly A Chase

(74) *Attorney, Agent, or Firm* — Crowell & Moring LLP

(57) ABSTRACT

A storage system and method for balanced quad-level cell (QLC) coding with margin for an internal data load (IDL) read are provided. In one example, an MLC-Fine programming approach uses a balanced 3-4-4-4 coding, where the data is encoded by assigning a unique binary sequence per state. The IDL read is supported by using a unique 3-4-4-4 coding that provides at least a three-state gap between the MLC states, while using the same ECC redundancy per page. This allows for a reduced write buffer by supporting the IDL read and provides a balanced bit error rate (BER) due to the balanced mapping.

19 Claims, 7 Drawing Sheets

STORAGE SYSTEM AND METHOD FOR BALANCED QUAD-LEVEL CELL (QLC) CODING WITH MARGIN FOR AN INTERNAL DATA LOAD (IDL) READ

BACKGROUND

When writing data to a non-volatile memory having a multi-level cell (MLC) configuration, the process is typically accomplished by storing each of the plurality of bits for a cell in random access memory (RAM) in the memory controller for all the cells in a complete wordline in the memory and then proceeding with a multiple-stage programming process for injecting charge into each multi-bit cell to achieve the programmed state desired for that cell. Usually, the multi-stage programming involves initially programming part of the states with widened voltage distributions (i.e., the "Foggy" programming step), followed by final programming of all the states with tight voltage distribution (i.e., the "Fine" programming step). As part of this multiple-step programming process, and for each of the multiple programming steps, memory in the controller can store a copy of all the data bits to be programmed in a cell and process the error correction code (ECC) bits for the data. In case that the data programmed at the Foggy programming step may be read from the memory array without errors or be reliably decoded within the memory die for enabling the following Fine programming step, the Foggy data does not need to be stored aside temporarily in the memory controller until the Fine step, and the memory buffer within the memory controller may be reduced in size.

DETAILED DESCRIPTION

Figure 1A:
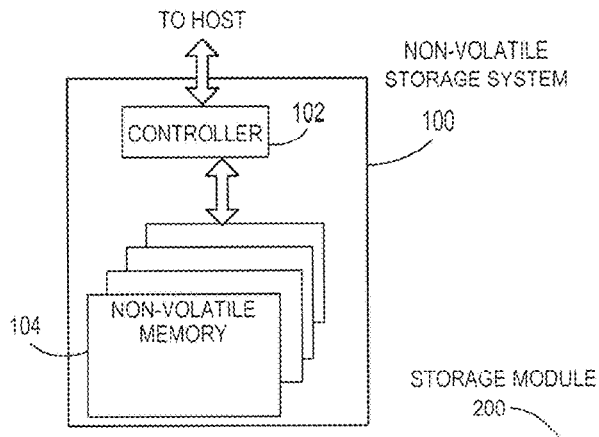
FIG. 1A is a block diagram of a non-volatile storage system of an embodiment.
Figure 1B:
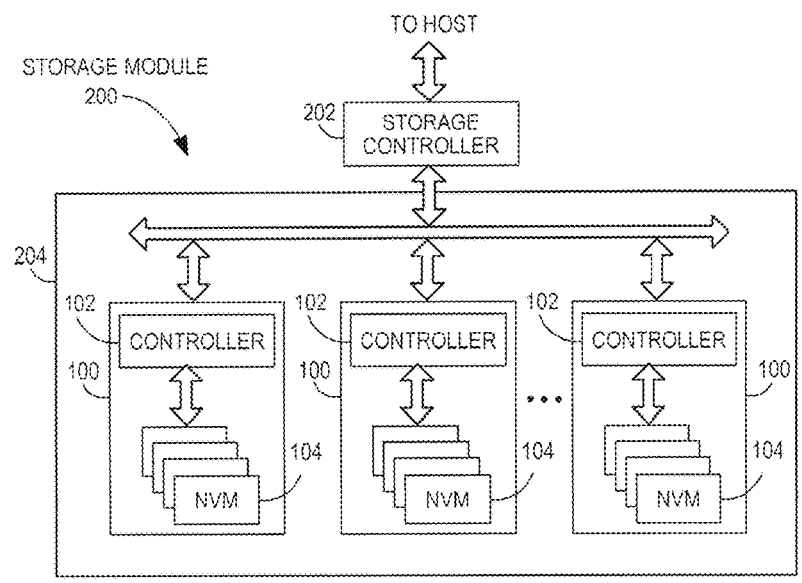
FIG. 1B is a block diagram illustrating a storage module of an embodiment.
Figure 1C:
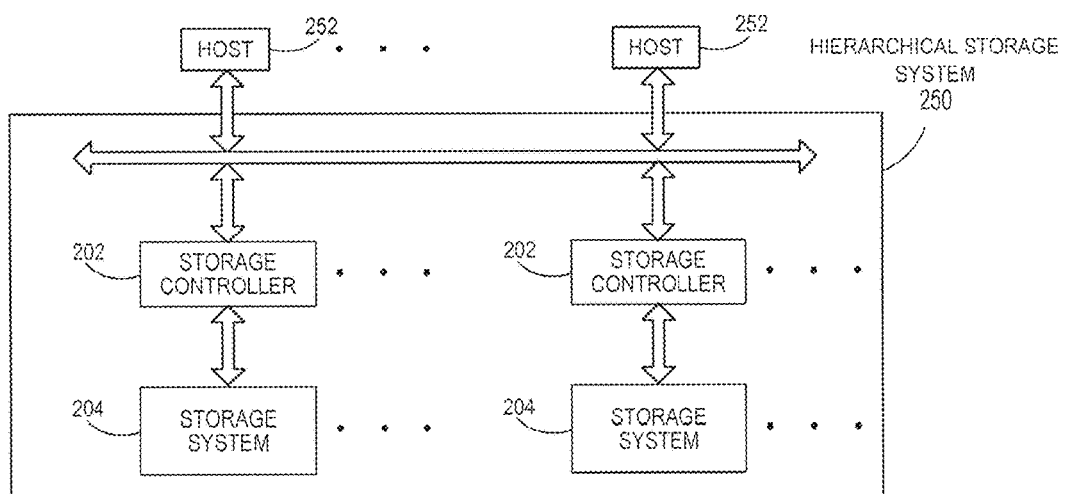
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
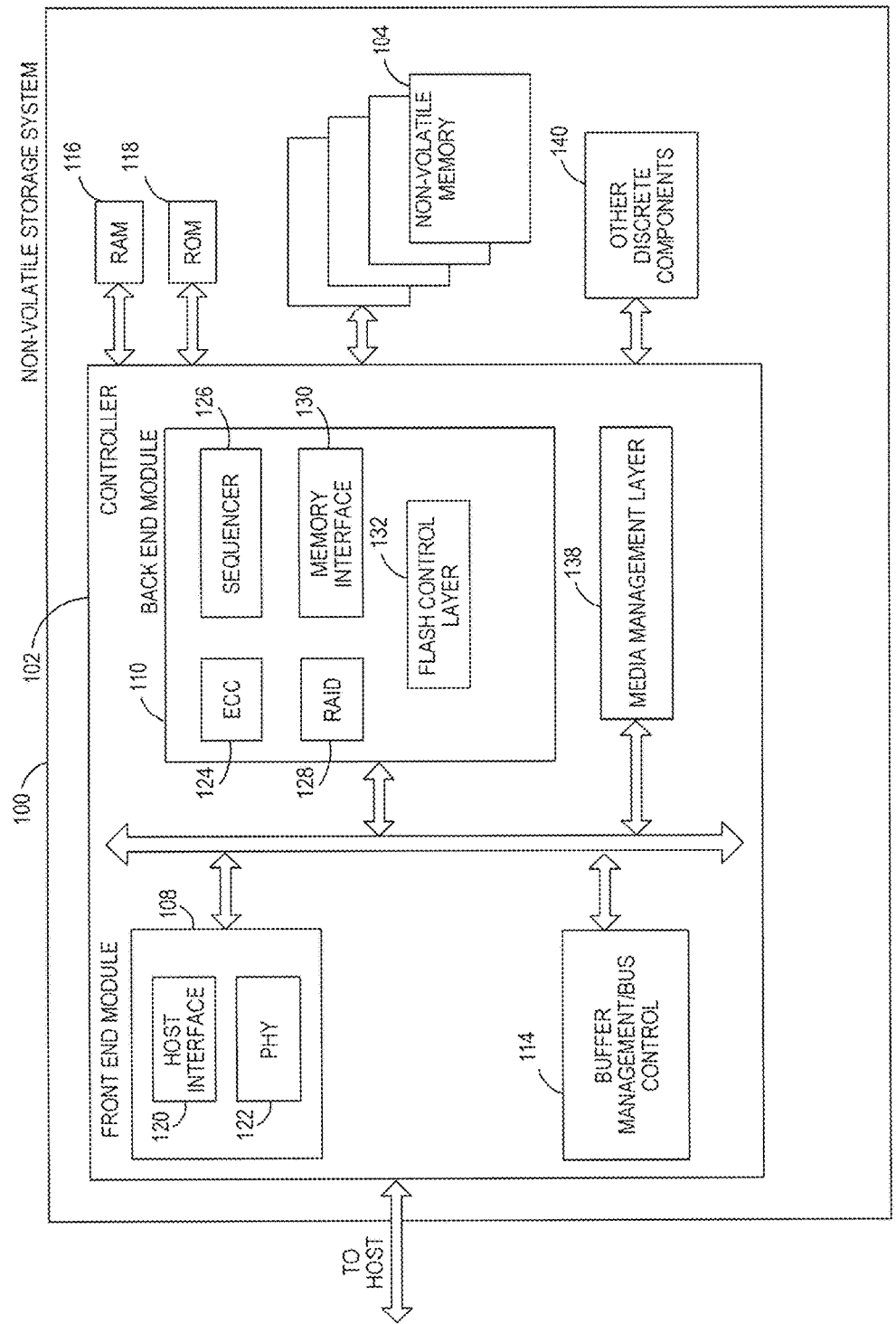
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
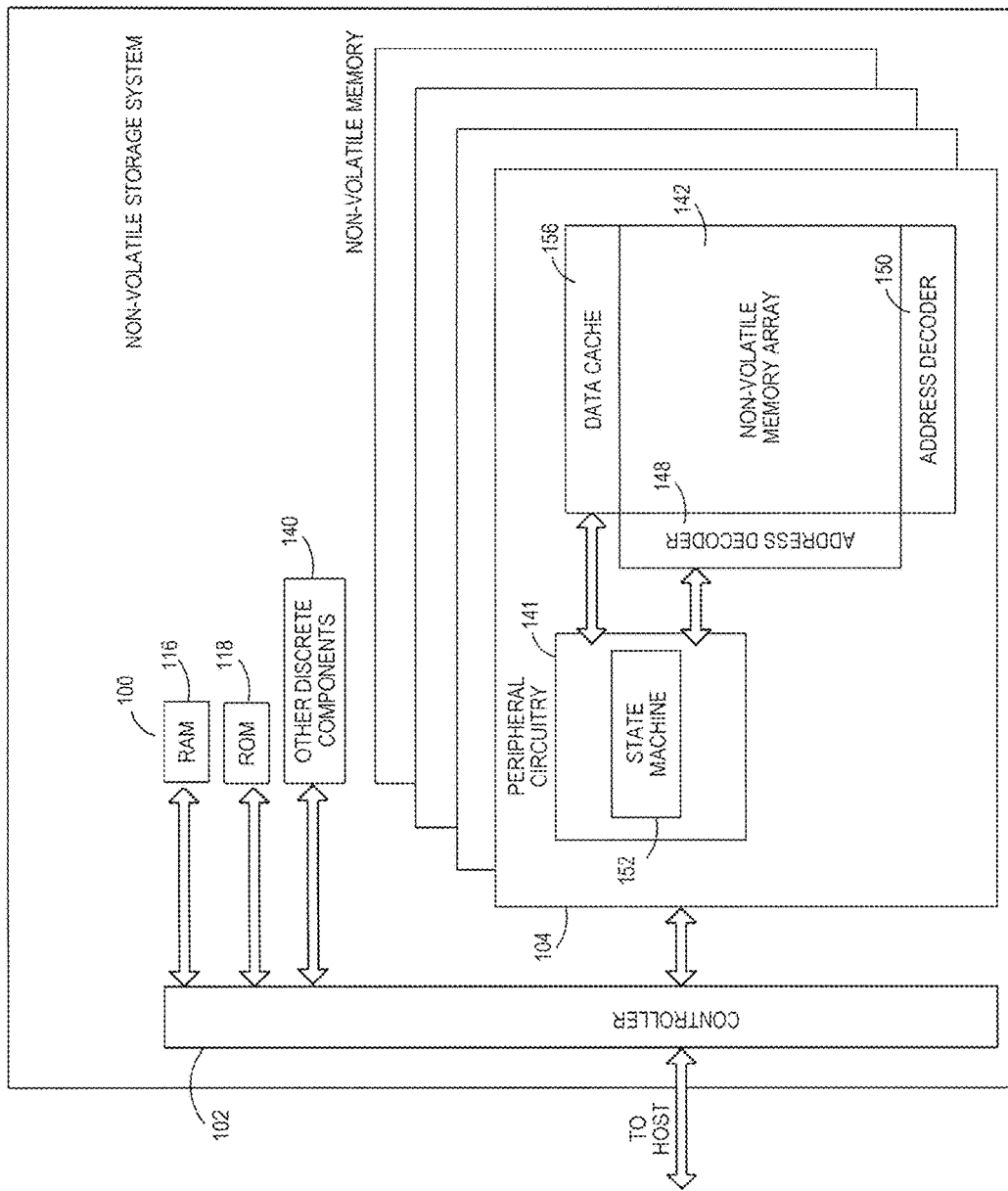
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, when writing data to a non-volatile memory having a multi-level cell (MLC) configuration, the process is typically accomplished by storing each of the plurality of bits for a cell in random access memory (RAM) in the memory controller for all the cells in a complete wordline in the memory and then proceeding with a multiple-stage programming process for injecting charge into each multi-bit cell to achieve the programmed state desired for that cell. Usually, the multi-stage programming involves initially programming part of the states with widened voltage distributions (i.e., the "Foggy" programming step), followed by final programming of all the states with tight voltage distribution (i.e., the "Fine" programming step). As part of this multiple-step programming process, and for each of the multiple programming steps, memory in the controller can store a copy of all the data bits to be programmed in a cell and process the error correction code (ECC) bits for the data. In case that the data programmed at the Foggy programming step may be read from the memory array without errors or be reliably decoded within the memory die for enabling the following Fine programming step, the Foggy data does not need to be stored aside temporarily in the memory controller until the Fine step, and the memory buffer within the memory controller may be reduced in size. Foggy-Fine programming schemes are well known for programming multi-level cell memories.

When an error-free internal Foggy read within the memory die (i.e., the Internal Data Load (IDL) read) is not possible, the Foggy data needs to be stored temporarily in a write buffer within the memory controller in order to be re-used during the Fine stage. The size of the memory write buffer required for enabling Foggy-Fine programming grows as the number of memory planes and strings increases, which is the common trend as memory generations advance for sake of memory cost reduction. For example, a memory with 6 strings×4 planes×4 pages of 16 KB per may require a write buffer of ~1.5 MB per memory die, which significantly increases the controller cost. Hence, a scheme which allows for a reliable Foggy read within the memory die (IDL read) is highly desired.

One such scheme is an MLC-Fine programming scheme, in which two pages are programmed during the Foggy stage ("MLC" programming) and two pages are added in the Fine stage. Such MLC-Fine programming significantly reduces the required write buffer to ~128 KB-256 KB per die. Such a programming scheme requires a margin for an MLC internal data load (IDL) read. An IDL read is used to read back memory cells after programming the first page/s but prior to programming the second page/s. This read can store the first page into a set of data latches on the memory chip and can result in the first page of data being loaded into the data latches without data being transferred off the chip to the data latches.

However, not every state coding can provide such margin. For example, the balanced 3-4-4-4 coding for QLC, shown on FIG. 6, does not provide such margin. Non-balanced coding like 2-3-5-5 or 1-2-6-6 may provide margin for an IDL read but may induce an un-balanced BER and tR per page, which are undesirable. Hence, for the sake of balancing the BER and the tR between pages, it may be desired to use a state coding with a balanced number of transitions per page (i.e., the 3-4-4-4 coding).

However, as QLC Foggy-Fine programming requires a very large write buffer, MLC-Fine programming is being considered. MLC-Fine programming requires a significantly smaller write buffer, by relying on the ability to perform an IDL read of the MLC page, hence avoiding the need to store it in the controller write buffer. This may reduce the required write buffer size for QLC from 1536 KB to 128 KB-256 KB. The issue is that almost all balanced 3-4-4-4 mappings do not fit well for MLC-Fine programing as they do not provide a sufficient margin for IDL read. Unbalanced mappings such as, 2-3-5-5 and 1-2-6-6 coding can provide larger margin for IDL read but result in unbalanced Bit Error Rate (BER) per page. Having unbalanced BER per page means that more ECC redundancy is required in order to achieve the same reliability (as the ECC needs to cope with the worst page). This, in turn, reduces the memory cost efficiency as more overhead needs to be allocated for ECC.

The following embodiments provide an alternative 3-4-4-4 coding that provides high margin for the MLC IDL read. In general, these embodiments disclose an MLC-Fine programming approach using a balanced 3-4-4-4 coding, wherein the data is encoded by assigning a unique binary sequence per state. The IDL read (i.e., the internal read of the MLC data) is supported by using a unique 3-4-4-4 coding that provides at least a three-state gap between the MLC states, while using the same ECC redundancy per page. This allows for a reduced write buffer by supporting the IDL read and provides a balanced bit error rate (BER) due to the balanced mapping.

The following paragraph explains the impact of the state coding on the expected BER and the sensitivity of the BER to state positioning jitter, providing motivation to use balanced state coding.

Regarding the state coding impact on BER, in one embodiment, an ECC codeword is contained within a logical page ("non-interleaved coding"). This means that we are governed by the worst page within the wordline. Hence, it is desired to balance the BER among different pages. Using a non-balanced state coding requires adjusting the verify levels to position the state distributions non-uniformly in a way that would induce equal BER for all the logical pages. This does not come for free, as non-balanced coding has two downsides. First, due to the non-uniform spacing of the states, for a given voltage window and state width, the BER gets elevated. Second, the sensitivity to any "jitter" in the position of the distribution is increased. As the memory operates under variable operational conditions (e.g., P/E, DR, Xtemp, disturbs, etc.), we can never ensure perfect positioning of the states under all conditions. Due to the above, it is highly desirable to use a 3-4-4-4 balanced state coding.

Figure 3:
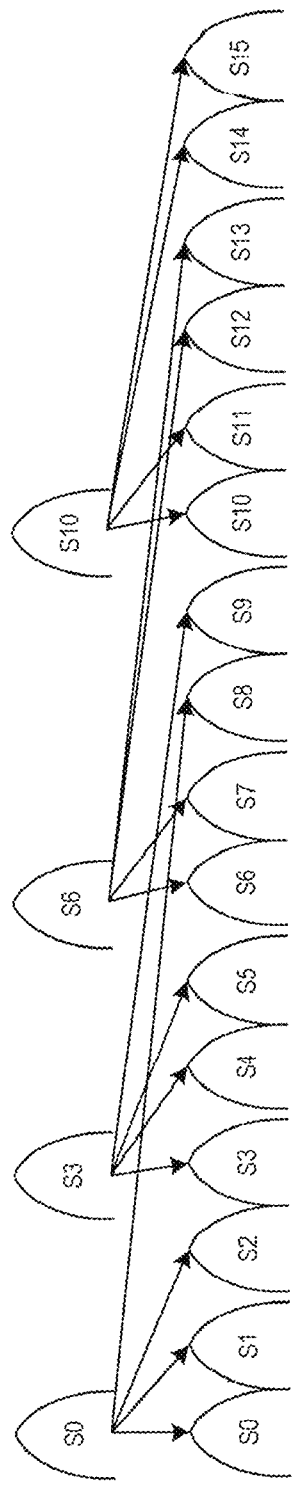
FIG. 3 is a chart and graph that illustrate 3-4-4-4 coding of an embodiment.

In one embodiment, a new 3-4-4-4 state coding is provided to overcome these problems. This coding provides higher margin for IDL read of the MLC page, which may enable MLC-Fine programming. As shown in FIG. 3, the MLC stage will program states S0, S3, S6, and S10, which gives at least a three state margin for IDL read.

Figure 4:
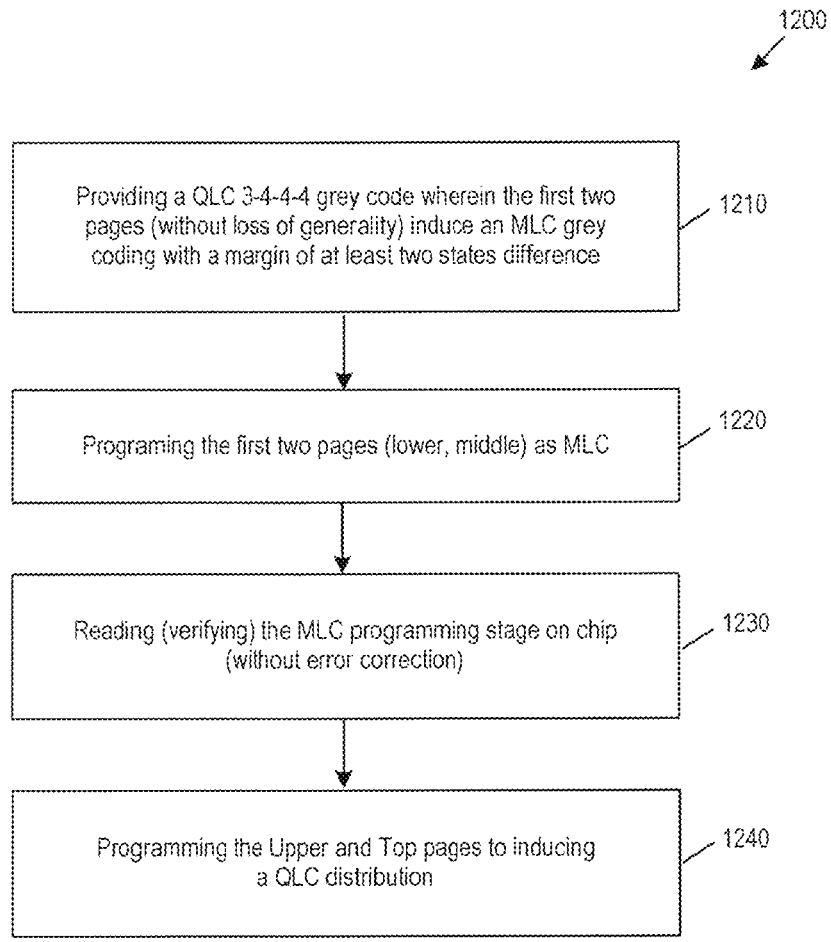
FIG. 4 is a flow chart of a method of an embodiment.

FIG. 4 is a flow chart 1200 of a method of an embodiment. As shown in FIG. 4, a QLC 3-4-4-4 grey code is provided (act 1210). In this code, the first two pages (without loss of generality) induce an MLC grey coding with a margin of at least a two state difference (act 1210). The first two pages (lower and middle) are then programmed as MLC (act 1220). The MLC programming stage is then read (verified) on chip (without error correction) (act 1230). Then, the upper and top pages are programmed to induce a QLC distribution (act 1240).

Regarding handling an ungraceful shutdown (UGSD), in case of a write abort (WA) due to a power loss, the storage system can program the data in the four latches into SLC memory (utilizing capacitor energy). During power up, the data will be recovered by reading the SLC pages (which contain the latches' state during the WA) and the write-aborted QLC page. For each cell, the latch state will indicate whether the cell was already verified/inhibited, in which case its QLC data is valid or if it was not yet verified, in which case its SLC data is the valid data.

Figure 5:
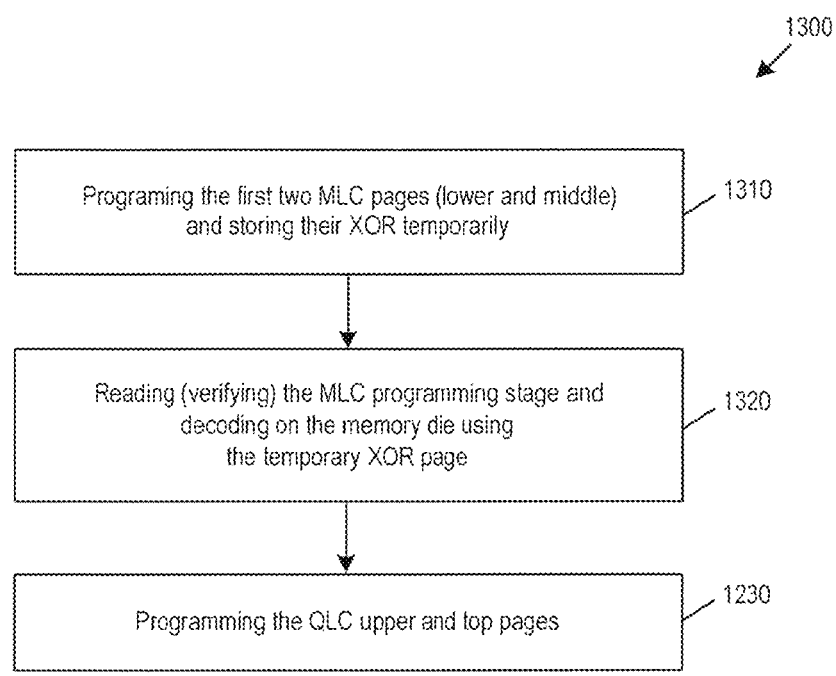
FIG. 5 is a flow chart of another method of an embodiment.

Alternatively, the XOR (L pages across all strings) and XOR (M pages across all strings) can be stored into SLC. In this example, two SLC pages are programmed once every X QLC pages, where X is the number of strings within the memory die. In case of a power loss during the MLC stage programming, the two XOR pages are flushed into SLC. The lower and middle pages can be recovered from the XOR pages and the other successfully-programmed pages after power up. In case of a power loss during the fine stage, the top and upper pages can be flushed into SLC. The lower and middle pages can be recovered from the XOR pages and the other successfully-programmed pages after power up. The top and upper pages can be recovered from the flushed SLC pages FIG. 5 is a flow chart 1300 of another method of an embodiment. As shown in FIG. 5, the first two MLC pages (lower and middle) are programmed and their XOR is stored temporarily (act 1310). Then, the MLC programming stage is read (verified) and decoded on the memory die using the temporary XOR page (act 1320). Then the QLC upper and top pages are programmed (act 1230).

Figure 6:
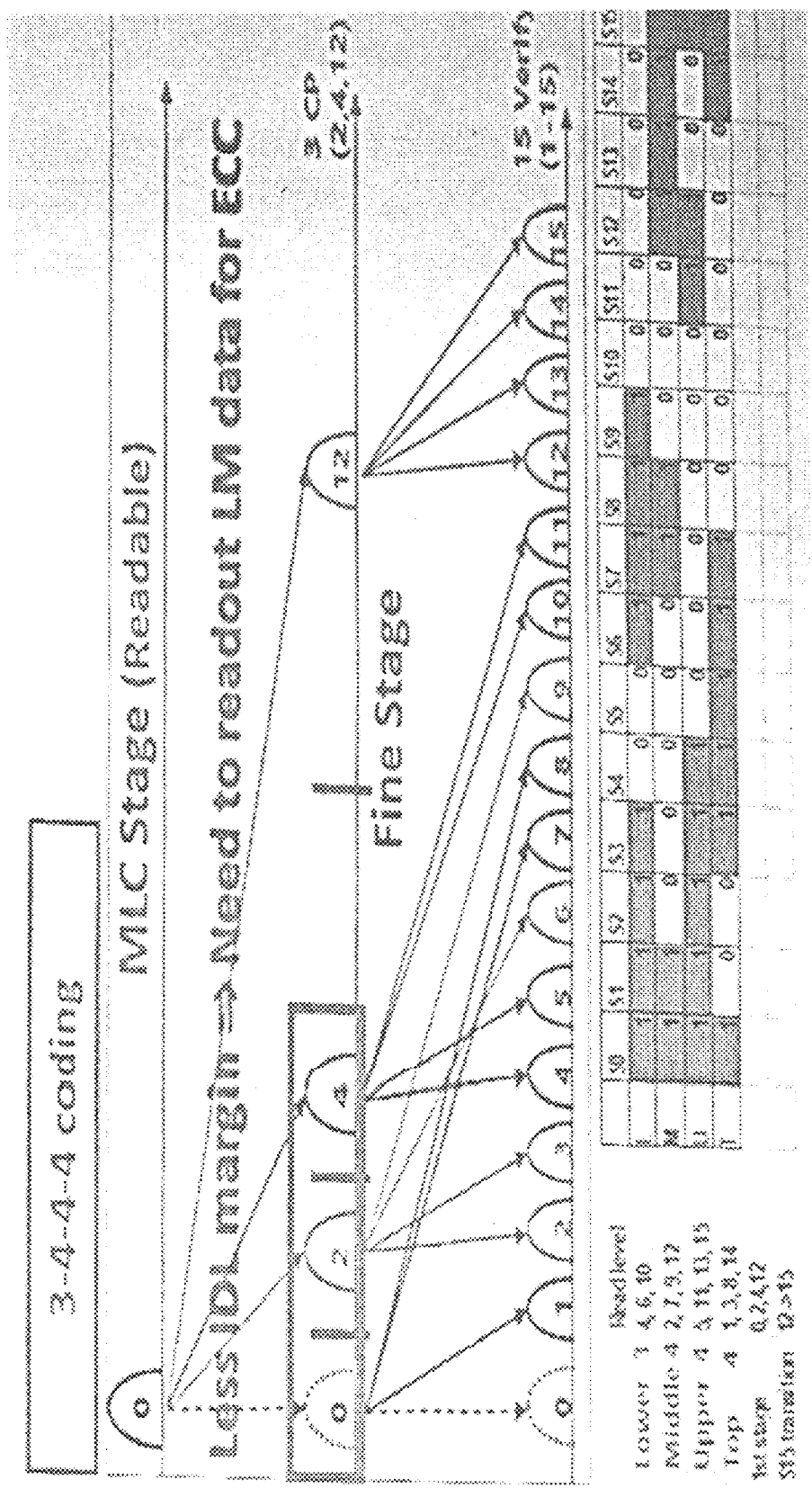
FIG. 6 is a graph of a method of an embodiment for using a coding scheme to assist a read operation.

FIG. 6 is a graph that illustrates this embodiment of using a conventional 3-4-4-4 state coding (which does not provide margin for IDL read) with XOR (L, M) to assist an IDL read. In this embodiment, the conventional 3-4-4-4 mapping is used to support MLC-Fine by storing the XOR (L, M) in the controller write buffer and transferring this XOR page to the NAND during the Fine stage for sake of IDL read. Using the XOR (L, M) page, we can do the IDL read with enough margin. If the XOR bit is 0, then the MLC state that was programmed was (0 or 4), and if the XOR bit is 1, then the MLC state that was programmed is (2 or 12). Hence, we can perform the IDL read by issuing two senses, one between 0 and 4 and the other between 2 and 12 and select the relevant result based on the XOR bit. The write buffer per die for this scheme can be 64 KB*1 str*2 pages+64 KB*Xstr*1 page (XOR)=(X+2)*64 KB.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
    a memory; and
    a controller configured to:
        apply a quad-level cell (QLC) 3-4-4-4 grey code to lower and middle pages of data, which induce a multi-level cell grey coding with a margin of at least a two state difference;
        program the lower and middle pages of data in the memory using a multi-level cell programming operation;
        read the programming of the lower and middle pages of data in the memory; and
        program upper and top pages of data in the memory to induce a quad-level cell (QLC) distribution using the read lower and middle pages.

2. The storage system of claim 1, wherein the read data is retrieved without using error correction.

3. The storage system of claim 1, wherein the lower, middle pages are read from the memory array without retrieving them from a write buffer in the controller.

4. The storage system of claim 1, wherein the memory comprises a three-dimensional memory.

5. The storage system of claim 1, wherein the storage system is configured to be embedded in a host.

6. The storage system of claim 1, wherein the storage system is configured to be removably connected to a host.

7. In a storage system comprising a memory and a controller, a method comprising:
    programming lower and middle pages of data in the memory using a multi-level cell programming operation;
    generating an exclusive-or of the lower and middle pages of data in the memory;
    storing the exclusive-or of the lower and middle pages of data in the storage system;
    reading the programming of the lower and middle pages of data in the memory;
    decoding the lower and middle pages of data using the exclusive-or of the lower and middle pages of data; and
    programming upper and top pages of data in the memory.

8. The method of claim 7, wherein the exclusive-or of the lower and middle pages of data is stored in a temporary location in the storage system.

9. The method of claim 7, wherein the read data is retrieved without using error correction.

10. The method of claim 7, wherein the lower, middle pages are read from the memory array without retrieving them from a write buffer in the controller.

11. The method of claim 7, wherein the memory comprises a three-dimensional memory.

12. The method of claim 7, wherein the storage system is configured to be embedded in a host.

13. The method of claim 7, wherein the storage system is configured to be removably connected to a host.

14. A storage system comprising:
    a memory;
    means for applying a quad-level cell (QLC) 3-4-4-4 grey code to lower and middle pages of data, which induce a multi-level cell grey coding with a margin of at least a two state difference;

means for programming the lower and middle pages of data in the memory using a multi-level cell programming operation;

means for reading the programming of the lower and middle pages of data in the memory; and means for programming upper and top pages of data in the memory to induce a quad-level cell (QLC) distribution.

15. The storage system of claim 14, wherein the read data is retrieved without using error correction.

16. The storage system of claim 14, wherein the lower, middle pages are read from the memory array without retrieving them from a write buffer in the controller.

17. The storage system of claim 14, wherein the memory comprises a three-dimensional memory.

18. The storage system of claim 14, wherein the storage system is configured to be embedded in a host.

19. The storage system of claim 14, wherein the storage system is configured to be removably connected to a host.

\* \* \* \* \*